(12) United States Patent
Hammad et al.

(10) Patent No.: US 12,153,178 B2
(45) Date of Patent: Nov. 26, 2024

(54) SEISMIC DENOISING BY WEIGHTED MULTIPLANAR RECONSTRUCTION

(71) Applicant: SAUDI ARABIAN OIL COMPANY, Dhahran (SA)

(72) Inventors: Hussain I. Hammad, Tarut (SA); Weihong Zhu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 451 days.

(21) Appl. No.: 17/652,165

(22) Filed: Feb. 23, 2022

(65) Prior Publication Data

US 2023/0266493 A1   Aug. 24, 2023

(51) Int. Cl.
*G01V 1/34*     (2006.01)
*E21B 49/08*    (2006.01)

(52) U.S. Cl.
CPC ............ *G01V 1/345* (2013.01); *E21B 49/087* (2013.01); *G01V 2210/32* (2013.01); *G01V 2210/60* (2013.01); *G01V 2210/74* (2013.01)

(58) Field of Classification Search
CPC ............... G01V 1/345; G01V 2210/32; G01V 2210/60; G01V 2210/74; E21B 49/087
See application file for complete search history.

(56) References Cited

U.S. PATENT DOCUMENTS

| | | | |
|---|---|---|---|
| 4,330,872 A | | 5/1982 | Bratton |
| 4,813,027 A | * | 3/1989 | Tieman ................. G01V 1/362 702/18 |
| 5,103,429 A | | 4/1992 | Gelchinsky |
| 5,392,213 A | * | 2/1995 | Houston ................ G01V 1/362 702/17 |
| 7,630,865 B2 | | 12/2009 | Berkovitch et al. |
| 8,209,125 B2 | | 6/2012 | Berkovitch et al. |
| 9,864,084 B2 | | 1/2018 | Poole |

(Continued)

OTHER PUBLICATIONS

Berkovitch, Alex et al., "Multifocusing as a method of improving subsurface imaging"; The Leading Edge; vol. 27, Issue 2; pp. 250-256; Feb. 2008 (6 pages).

(Continued)

*Primary Examiner* — Krystine E Breier
(74) *Attorney, Agent, or Firm* — Osha Bergman Watanabe & Burton LLP

(57) ABSTRACT

A system and method for forming a denoised seismic image of a subterranean region of interest is provided. The method includes obtaining an observed seismic dataset for a subterranean region of interest and forming a plurality of common midpoint gathers having a plurality of traces, each trace having an ordinate series of sample values, a common-midpoint location and a unique value of a secondary sorting parameter. The method further includes, for each of the plurality of common midpoint gathers, selecting a set of spatially adjacent common midpoint gathers using a spatial windowing operator and determining a weighted midpoint gather based on the common midpoint gather and the set of spatially adjacent common midpoint gathers. The method still further includes forming a denoised seismic dataset by combining the weighted midpoint gathers using an inverse spatial windowing operator and forming the denoised seismic image based on the denoised seismic dataset.

20 Claims, 9 Drawing Sheets

(56) References Cited

U.S. PATENT DOCUMENTS

| | | | |
|---|---|---|---|
| 2010/0131205 A1 | 5/2010 | Berkovitch et al. | |
| 2014/0288842 A1* | 9/2014 | Maraschini | G01V 1/364 |
| | | | 702/17 |
| 2018/0321405 A1* | 11/2018 | Colombo | G01V 1/307 |
| 2018/0364380 A1* | 12/2018 | Bekara | G01V 1/307 |
| 2019/0317234 A1* | 10/2019 | Han | G01V 1/366 |

OTHER PUBLICATIONS

Borghi, Pablo et al., "Sierra de Reyes 3D seismic survey (onshore Argentina): depth imaging complex geology by applying multi-focusing, Kirchhoff, Beam and RTM workflows"; First Break; vol. 35, Issue 12; pp. 67-76; Dec. 2017 (10 pages).

Curia, David et al., "The impact of multifocusing in the processing of land 3D seismic data in a fold and thrust belt setting: Ranquil Norte Block, Neuquén Basin, Argentina"; The Leading Edge; vol. 36, Issue 9; pp. 770-774; Sep. 2017 (5 pages).

Gelchinsky, Boris et al., "Multifocusing homeomorphic imaging: Part 1. Basic concepts and formulas"; Journal of Applied Geophysics; vol. 42, Issues 3-4; pp. 229-242; Dec. 1999 (14 pages).

Landa, Evgeny et al., "Multifocusing revisited—inhomogeneous media and curved interfaces"; Geophysical Prospecting; vol. 58, Issue 6; pp. 925-938; Feb. 9, 2010 (14 pages).

Garabito, German et al., "Part II—CRS-beam PSDM: Kirchhoff-beam prestack depth migration using the 2D CRS stacking operator"; Journal of Applied Geophysics; vol. 85; pp. 102-110; Oct. 2012 (9 pages).

Hertweck, T. et al., "Data stacking beyond CMP"; The Leading Edge; vol. 26, Issue 7; pp. 818-827; Jul. 2007 (10 pages).

Walda, Jan et al., "A competitive comparison of multiparameter stacking operators"; Geophysics; vol. 82, Issue 4; pp. V275-V283; Jul.-Aug. 2017 (11 pages).

Baykulov, Mikhail et al., "Prestack seismic data enhancement with partial common-reflection-surface (CRS) stack"; Geophysics; vol. 74, Issue 3; pp. V49-V58; May-Jun. 2009 (10 pages).

Birgin, Ernesto G. et al., "Restricted optimization: a clue to a fast and accurate implementation of the Common Reflection Surface Stack method"; Journal of Applied Geophysics; vol. 42, Issues 3-4; pp. 143-155; Dec. 1999 (13 pages).

Mann, Jürgen et al., "Common-reflection-surface stack—a real data example"; Journal of Applied Geophysics; vol. 42, Issues 3-4; pp. 301-318; Dec. 1999 (18 pages).

Zhang, Yonghai et al., "Common-reflection-surface (CRS) stack for common offset"; Geophysical Prospecting; vol. 49, Issue 6; pp. 709-718; Dec. 2001 (10 pages).

Jäger, Rainer et al., "Common-reflection-surface stack: Image and attributes"; Geophysics; vol. 66, Issue 1; pp. 97-109; Jan.-Feb. 2001 (13 pages).

Marfurt, Kurt J., "Robust estimates of 3D reflector dip and azimuth"; Geophysics; vol. 71, Issue 4; pp. P29-P40; Jul.-Aug. 2006 (12 pages).

* cited by examiner

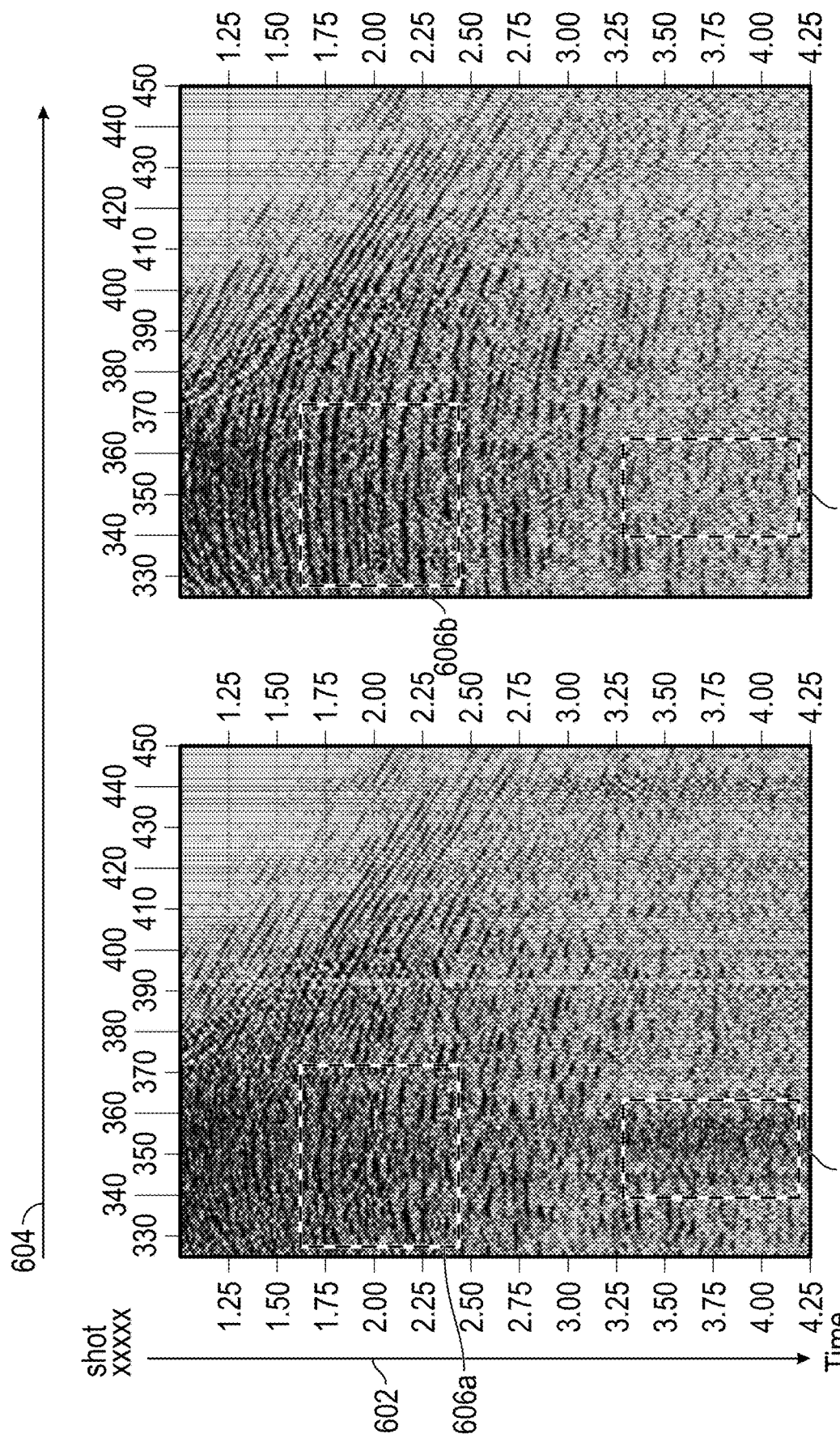

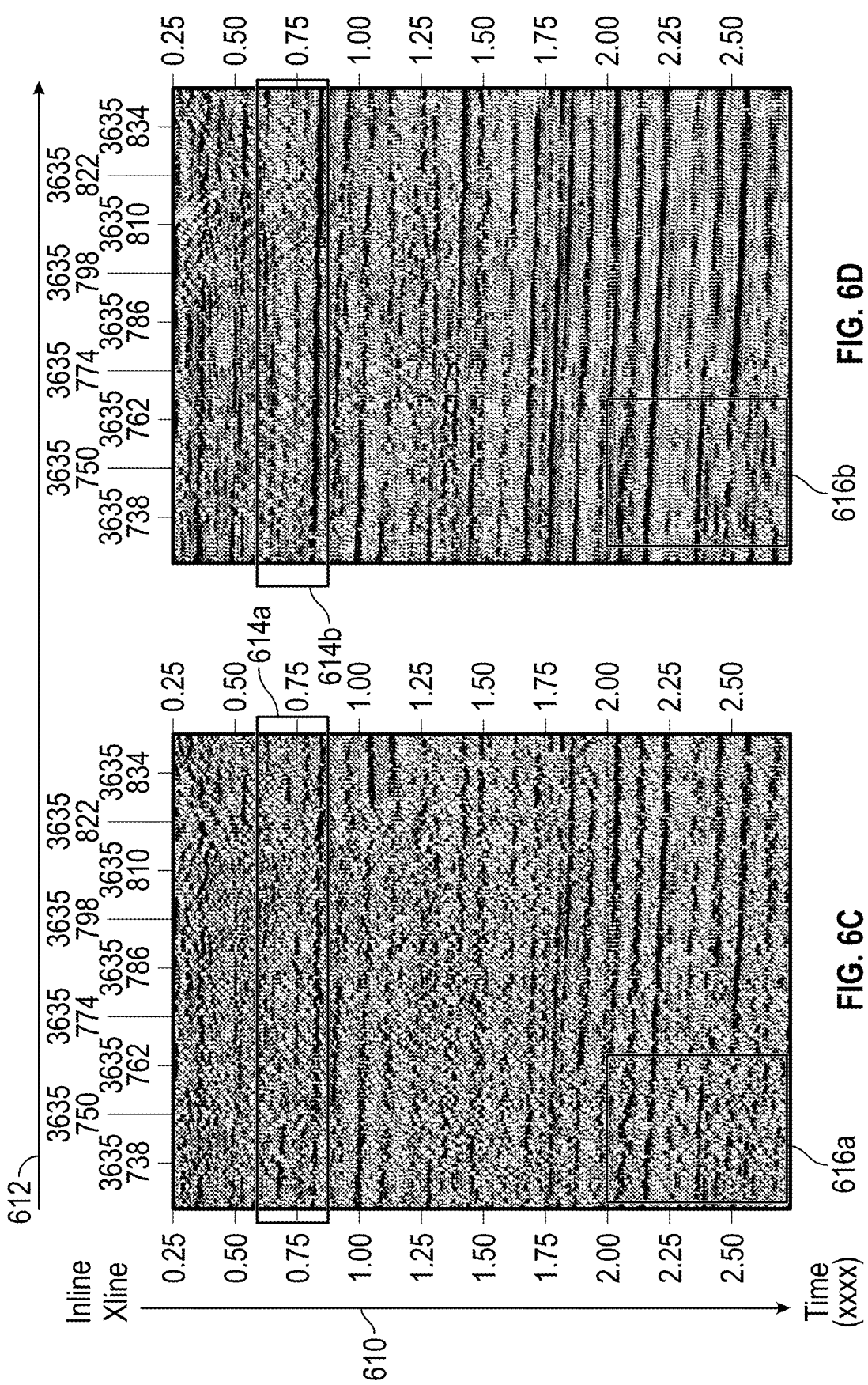

SEISMIC DENOISING BY WEIGHTED MULTIPLANAR RECONSTRUCTION

BACKGROUND

Seismic surveys are frequently conducted by participants in the oil and gas industry. Seismic surveys are conducted over subsurface regions of interest during the search for, and characterization of, hydrocarbon reservoirs. In seismic surveys, a seismic source generates seismic waves that propagate through the subterranean region of interest and are detected by seismic receivers. The seismic receivers detect and store a time-series of samples of earth motion caused by the seismic waves. The collection of time-series of samples recorded at many receiver locations generated by a seismic source at many source locations constitutes a seismic data set.

To determine earth structure, including the presence of hydrocarbons, the seismic data set may be processed. Processing a seismic data set includes a sequence of steps designed to correct for a number of issues, such as near-surface effects, seismic noise, irregularities in the seismic survey geometry, etc. Seismic noise may be any unwanted recorded energy that is unintentionally present in a seismic data set. Seismic noise may mask a target within the subterranean region of interest with a likelihood of containing hydrocarbons. Seismic denoising is a process by which seismic noise is removed from the seismic dataset and may aid in imaging the target. A properly processed seismic data set may aid in decisions as to if and where to drill for hydrocarbons, based at least in part, on the target.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for forming a denoised seismic image of a subterranean region of interest. This method includes obtaining an observed seismic dataset for a subterranean region of interest and forming a plurality of common midpoint gathers having a plurality of traces, each trace having an ordinate series of sample values, a common-midpoint location and a unique value of a secondary sorting parameter. The method also includes, for each of the plurality of common midpoint gathers, selecting a set of spatially adjacent common midpoint gathers using a spatial windowing operator and determining a weighted midpoint gather based on the common midpoint gather and the set of spatially adjacent common midpoint gathers. The method also includes forming a denoised seismic dataset by combining the weighted midpoint gathers using an inverse spatial windowing operator and forming the denoised seismic image based on the denoised seismic dataset.

In general, in one aspect, embodiments relate to a non-transitory computer readable medium storing instructions executable by a computer processor, the instructions including functionality for obtaining an observed seismic dataset for the subterranean region of interest and forming a plurality of common midpoint gathers having a plurality of traces, each trace having an ordinate series of sample values, a common-midpoint location and a unique value of a secondary sorting parameter. The instructions also include the functionality for selecting, for each of the plurality of common midpoint gathers, a set of spatially adjacent common midpoint gathers using a spatial windowing operator and determining a weighted midpoint gather based on the common midpoint gather and the set of spatially adjacent common midpoint gathers. The instructions also include the functionality for forming a denoised seismic dataset by combining the weighted midpoint gathers using an inverse spatial windowing operator, forming the denoised seismic image based on the denoised seismic dataset and identifying a target within the subterranean region of interest with a likelihood of containing hydrocarbons based on the denoised seismic image.

In general, in one aspect, embodiments relate to a system that includes a seismic acquisition system configured to acquire an observed seismic dataset and a seismic processor. The seismic processor from the system is configured to receive the observed seismic dataset from the seismic acquisition system and form a plurality of common midpoint gathers having a plurality of traces, each trace having an ordinate series of sample values, a common-midpoint location and a unique value of a secondary sorting parameter. The seismic processor is configured further to select, for each of the plurality of common midpoint gathers, a set of spatially adjacent common midpoint gathers using a spatial windowing operator and determine a weighted midpoint gather based on the common midpoint gather and the set of spatially adjacent common midpoint gathers. The seismic processor is configured further to form a denoised seismic dataset by combining the weighted midpoint gathers using an inverse spatial windowing operator, form the denoised seismic image based on the denoised seismic dataset and identify a target within the subterranean region of interest with a likelihood of containing hydrocarbons based on the denoised seismic image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 6A-6D show a seismic data comparison in accordance with one or more embodiments.

DETAILED DESCRIPTION

Figure 1:
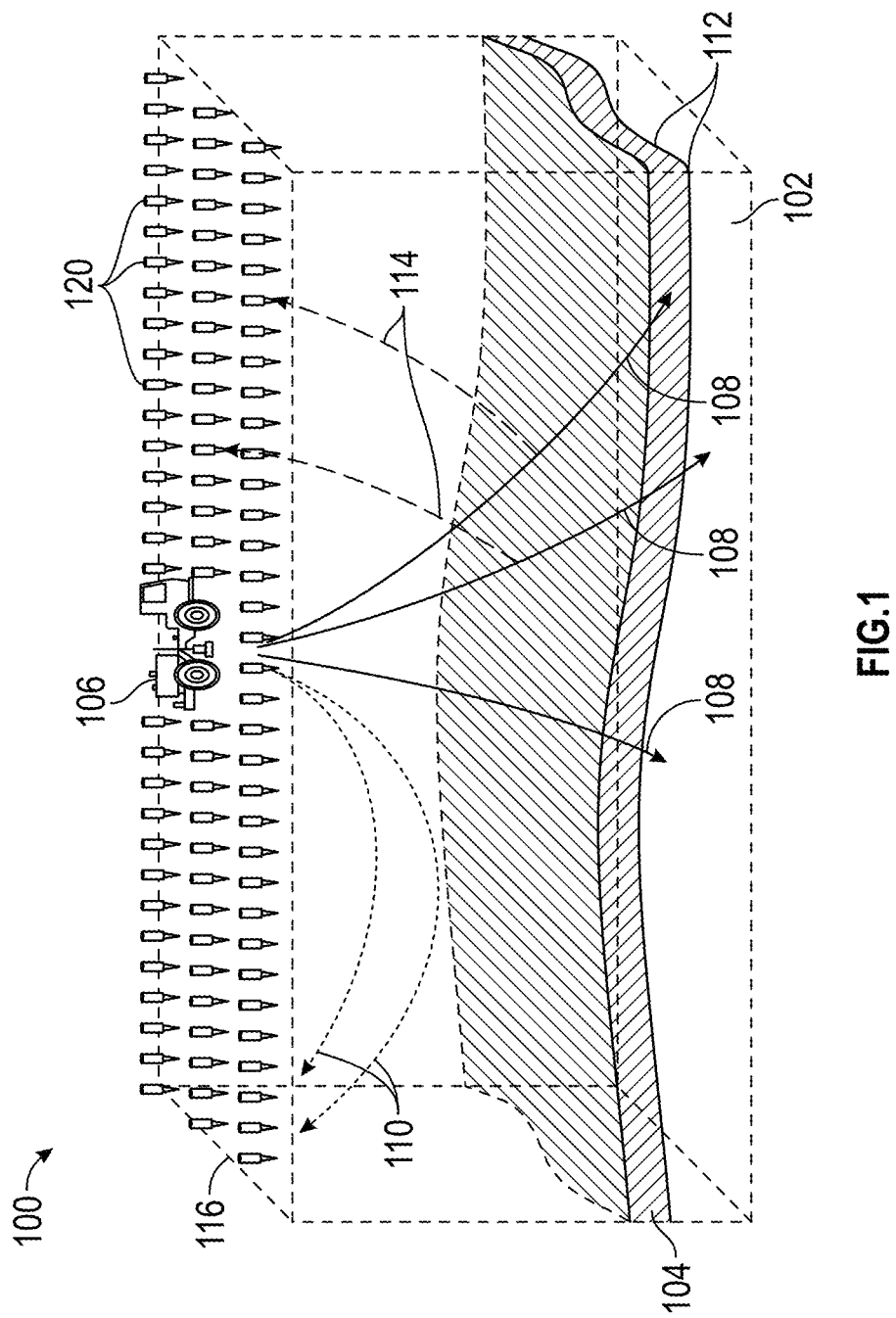
FIG. 1 depicts a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic data set" includes reference to one or more of such seismic data set.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which is ray paths obeying Snell's law can be traced.

A velocity model represents the seismic velocity or the speed with which a seismic wave propagates through a subsurface material. Different subsurface materials may exhibit different seismic velocities. A velocity model may be determined from a seismic dataset using a variety of methods, known to a person of ordinary skill in the art, collectively called "velocity analysis".

A geological model is a spatial representation of the distribution of sediments and rocks (rock types) in the subsurface.

Seismic noise may be any unwanted recorded energy that is present in a seismic data set. Seismic noise may be random or coherent and its removal, or "denoising," is desirable in order to improve the accuracy and resolution of the seismic image. For example, seismic noise may include, without limitation, swell, wind, traffic, seismic interference, mud roll and ground roll. A properly processed seismic data set may aid in decisions as to if and where to drill for hydrocarbons.

The embodiments disclosed herein describe methods and systems for seismic denoising by weighted multiplanar reconstruction of a seismic dataset. Embodiments of the disclosed method select a set of spatially adjacent common midpoint (CMP) gathers using a spatial windowing operator. Secondary gathers are created by selecting a seismic trace from each of the spatially adjacent common midpoint gathers that have a common value of a secondary sorting parameter. A seismic trace may be a time series, with samples at monotonically increasing times, or after some processing, a depth series with samples at monotonically increasing depths. Hereinafter, "ordinate axis" shall refer to an ordinate axis that may be a time axis or a depth axis and "ordinate window" shall refer to an ordinate window that may be a time window or a depth window. In accordance with embodiments herein, the secondary gathers go through a windowed transformation, performed in a window defined by an ordinate windowing operator, creating a transformed gather with transformed traces. For each transformed trace, a weight is calculated based on the energy of the trace and applied by a scaling operator to create a weighted transformed trace. A weighted secondary trace is then created by performing the inverse windowed transformation, within the ordinate window defined by the ordinate windowing operator. A weighted midpoint gather is created based on the ensemble of weighted secondary traces with an application of an inverse ordinate windowing operator. A denoised seismic dataset is formed by combining the weighted midpoint gathers using an inverse spatial windowing operator and a denoised seismic image is formed based on the denoised seismic dataset.

FIG. 1 shows a seismic survey (100) of a subterranean region of interest (102), which may contain a reservoir (104). The seismic survey (100) may utilize a seismic source (106) on the surface of the earth (116) that generates radiated seismic waves (108). The radiated seismic waves (108) may return to the surface as refracted seismic waves (110) or may be reflected by geological discontinuities (112) and return to the surface as reflected seismic waves (114). At the surface, the refracted seismic waves (110) and reflected seismic waves (114) may be detected by seismic receivers (120).

In some embodiments, the refracted seismic waves (110) and reflected seismic waves (114) generated by a single activation of the seismic source (106) are recorded by a seismic receiver (120) as a time-series representing the amplitude of ground-motion at a sequence of discreet times. This time-series may be denoted a seismic "trace". The seismic receivers (120) are positioned at a plurality of seismic receiver locations that we may denote $(x_r, y_r)$ where x and y represent orthogonal axes on the surface of the earth (116) above the subterranean region of interest (102). Thus, the refracted seismic waves (110) and reflected seismic waves (114) generated by a single activation of the seismic source (106) may be represented as a three-dimensional "3D" volume with axes $(x_r, y_r, t)$ where $(x_r, y_r)$ represents the location of the seismic receiver (120) and t delimits the time sample at which the amplitude of ground-motion was measured.

A seismic survey (100) also may include recordings of seismic waves generated by a seismic source (106) that is positioned at a plurality of seismic source locations denoted $(x_s, y_s)$. Thus, all the data acquired by a seismic survey (100) may be represented as a five-dimensional volume, with coordinate axes $(x_s, y_s, x_r, y_r, t)$ and denoted a "seismic data set".

A seismic data set must be processed to generate a seismic velocity model of the subterranean region of interest (102) or an image of seismic reflectors within the subterranean region of interest (102). Seismic reflectors may be of the geological boundaries, such as the boundaries between geological layers, the boundaries between different pore fluids, faults, fractures or groups of fractures within the rock.

Processing a seismic data set comprises a sequence of steps designed, without limitation, to do one or more of the following: correct for near surface effects; attenuate noise; compensate for irregularities in the seismic survey geometry; calculate a seismic velocity model; image reflectors in the subsurface; calculate a plurality of seismic attributes to characterize the subterranean region of interest (102); and aid in decisions governing where to drill for hydrocarbons.

Figure 2A:
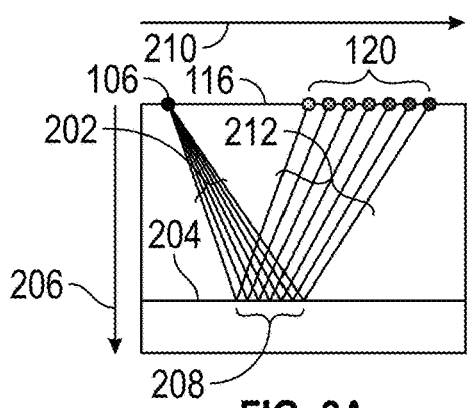
FIGS. 2A-2G show seismic gathers in accordance with one or more embodiments.

FIGS. 2A-2G depicts various stages of arrangements of seismic data, in accordance with one or more embodiments. FIG. 2A depicts seismic waves (202) radiating from a seismic source (106), reflecting from a seismic reflector (204) at a depth indicated by the vertical axis (206) and a plurality of horizontal reflection points (208), propagating as seismic reflections (212) back to the surface of the earth (116) and being recorded by an array of seismic receivers (120) covering a range of offsets (210) indicated by the horizontal axis. FIG. 2A depicts the acquisition geometry for recording a shot gather, depicted in FIG. 2B.

Figure 2B:
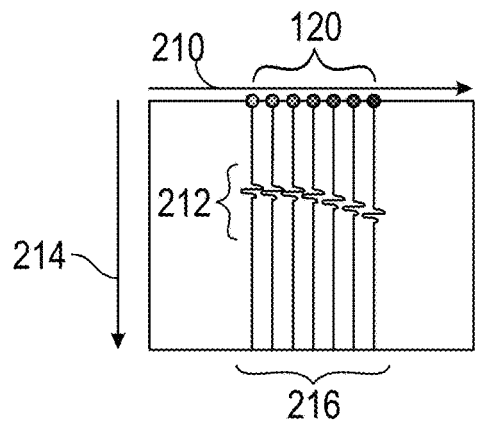

FIG. 2B depicts the plurality of seismic traces (216) recorded by the array of seismic receivers (120). These seismic traces (216), originating from a single seismic source location $(\bar{x}_s, \bar{y}_s)$, maybe denoted $D(t, x_r, y_r, \bar{x}_s, \bar{y}_s)$ and may be called a "source gather" or a "shot gather". The seismic reflections (212) may be detected on traces within a shot gather at increasing two-way travel times, indicated on the vertical axis (214), as the distance between the seismic source and the receiver, typically called "offset" (210) increases as indicated by the horizontal axis. This phenomenon of increasing two-way travel time with offset is often called "moveout".

Figure 2C:
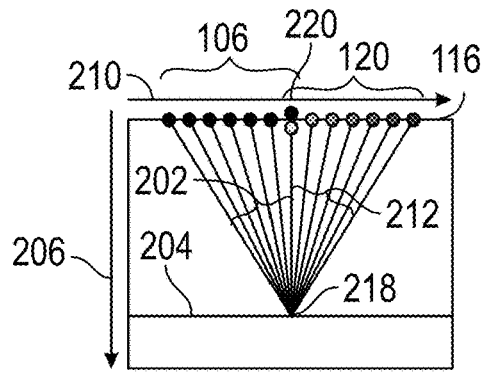

FIG. 2C depicts an alternative sorting of the seismic dataset that is used for the seismic denoising method, in accordance with one or more embodiments. FIG. 2C depicts seismic waves (202) radiating from a plurality of seismic sources (106), reflecting from a seismic reflector (204) at a depth indicated by the vertical axis (206). This single reflection point (218) of the seismic waves occurs at the same point on the seismic reflector (204) for all traces in the common-midpoint gather. Seismic reflections (212) propagate back to the surface of the earth (116) from this single reflection point (218) and are recorded by an array of seismic receivers (120) at an increasing offset (210) indicated by the horizontal axis. The seismic sources (106) and the seismic receivers (120) shown are selected to have a common midpoint (220), i.e., the point on the surface halfway between the seismic source (106) and seismic receiver (120) that is shared by all the selected seismic source-seismic receiver pairs. In practice, due to spatial irregularities in the seismic source (106) and seismic receiver (120) geometry, the halfway point of the selected seismic source (106) and seismic receiver (120) may not be identical but rather lie within a small range ("bin") of spatial locations. Such an arrangement of selected seismic data may be called a "common midpoint (CMP) gather".

Figure 2D:
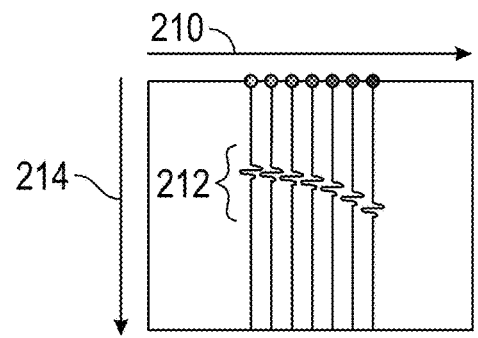

FIG. 2D depicts the plurality of seismic traces (216) of a CMP gather. The traces in a CMP gather may be denoted $D(t, x_o+\bar{x}_m, y_o+\bar{y}_m, x_o-\bar{x}_m, y_o-\bar{y}_m)$, where $(\bar{x}_m, \bar{y}_m)$ is the location of the midpoint and $(\bar{x}_o, \bar{y}_o)$ are vectors of offsets in the x- and y-directions. The seismic reflections (212) detected on seismic traces in a midpoint gather also exhibit two-way travel time. The two-way travel time of seismic reflections (212) detected on seismic traces may be said to form a "pre-stack horizon" at an increasing two-way travel time, indicated on the vertical axis (214), and at an increasing offset (210) indicated by the horizontal axis, $t_A(x_o+\bar{x}_m, y_o+\bar{y}_m, x_o-\bar{x}_m, y_o-\bar{y}_m)$. CMP gathers are widely used in velocity analysis, to perform a moveout corrections. The seismic reflections (212) may be "flattened" or moveout corrected, by picking a seismic velocity model which results in a flattened pre-stack horizon, shown in FIG. 2E.

Figure 2E:
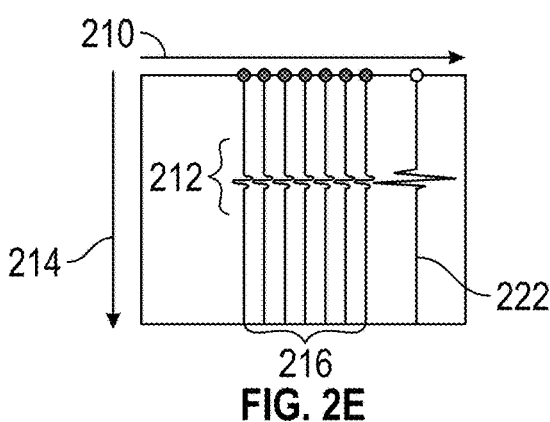

FIG. 2E shows a pre-stack CMP gather after a correction for two-way travel time moveout. After a correction for two-way travel time moveout, all of the seismic reflections (212) depicted on seismic traces form a single, flat seismic reflector arriving at the same moveout-corrected time indicated by the vertical axis (214) as the offset (210) of the detecting receiver increases along the horizontal axis. The corrected seismic traces (216) may be summed ("stacked") to form a post-stack seismic trace (222). Stacking is an essential part of seismic data processing and the post-stack seismic trace (222) may have a higher signal-to-noise ratio than traces in the CMP gather as random noise attenuated. The seismic denoising by weighted multiplanar reconstruction method requires the seismic dataset to be sorted into CMP gathers.

Figure 2F:
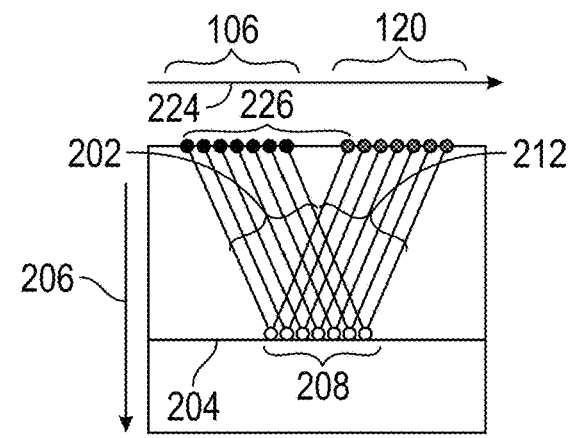

FIG. 2F shows an alternative sorting of the seismic dataset into a common-offset section. FIG. 2F depicts seismic waves (202) radiating from a group of seismic sources (106), reflecting from a seismic reflector (204) at a depth indicated by the vertical axis (206) and a plurality of horizontal reflection points (208), propagating as seismic reflections (212) back to the surface of the earth (116) and recorded by an array of seismic receivers (120). In FIG. 2F the seismic sources (106) and the seismic receivers (120) are arranged to have a common offset (226), that is the source-receiver horizontal separation distance is equal between each source-receiver pair in a common-offset section shown at a horizontal location (224) indicated on the horizontal axis. Common-offset traces may share a common offset; however, each have a different horizontal reflection point (208) and different midpoints and may hence provide a spatial map of subsurface reflectors.

Figure 2G:
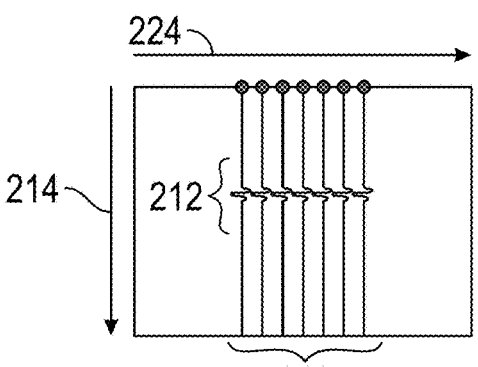

FIG. 2G shows the common-offset section with seismic reflections (212) detected on seismic traces (216) at a moveout-corrected time indicated by the vertical axis (214) as the horizontal location (224) of the detecting receiver increases along the horizontal axis. Each common-offset trace in a common-offset section has different horizontal reflection points (208) and therefore common-offset sections may be used for may be used for an initial or coarse mapping of seismic reflectors in the subsurface. The common-offset section may include traces with the exact same offset, or an offset that contains values within the limits of a predefined offset range.

Figure 3:
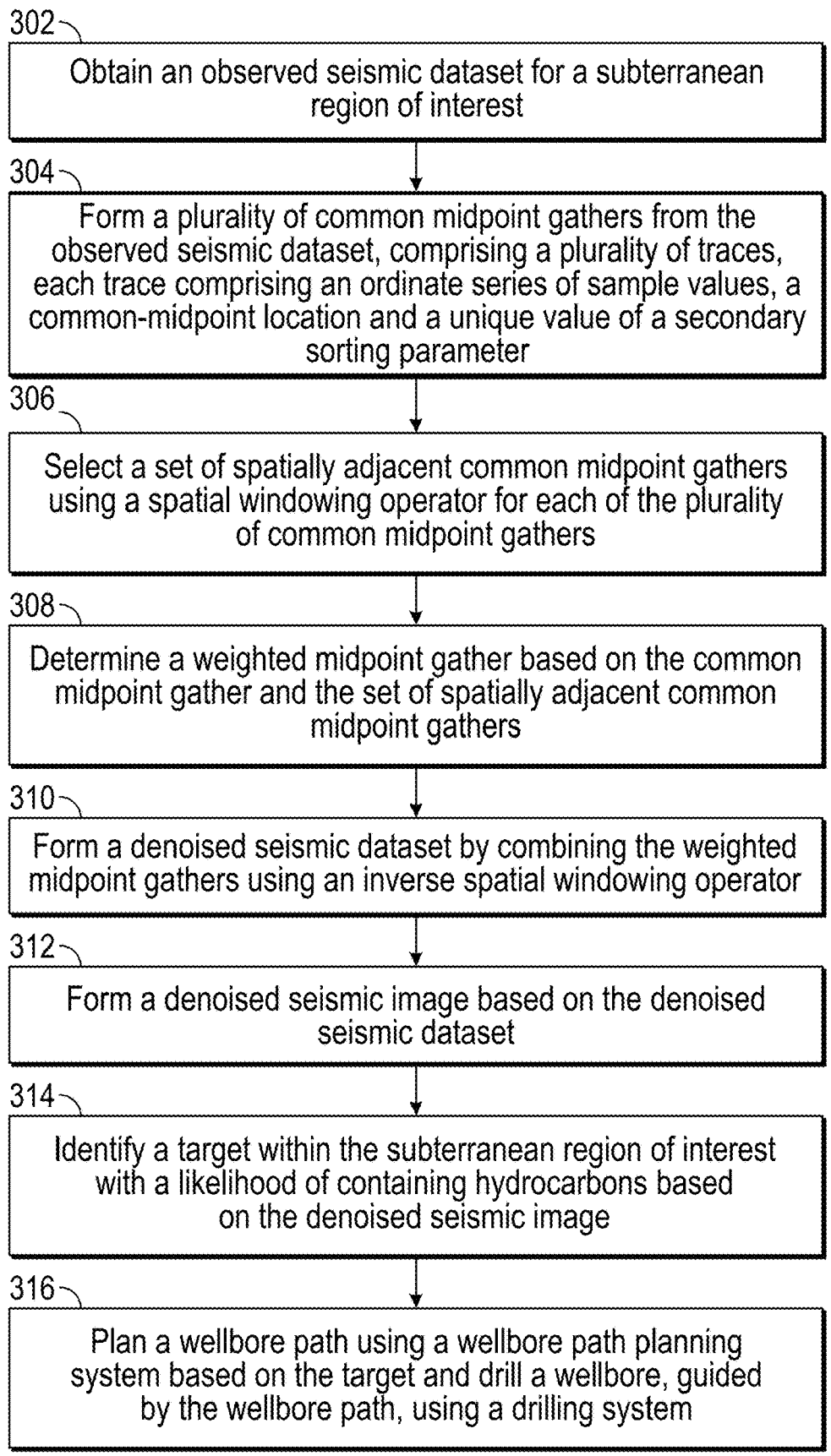
FIG. 3 shows a flowchart in accordance with one or more embodiments.

FIG. 3 shows a flowchart in accordance with one or more embodiments. The flowchart outlines a method for a seismic denoising by weighted multiplanar reconstruction of an observed seismic dataset for a subterranean region of interest.

In Step 302, in accordance with one or more embodiments, an observed seismic dataset for a subterranean region of interest is obtained. An observed dataset may be acquired by a system such as that shown in FIG. 1 or by any other seismic survey system as would be known by a person skilled in the art. The observed seismic dataset may be composed of a plurality of observed seismic traces each recorded using a physical seismic receiver. The observed dataset may be processed data or raw data (unprocessed data), unflattened gathers or flattened gathers from any flattening mechanism such as moveout, time or depth migrations.

In Step 304, in accordance with one or more embodiments, a plurality of CMP gathers are formed from the observed seismic dataset comprising a plurality of traces, each trace comprising an ordinate series of sample values, a common-midpoint location and a unique value of a secondary sorting parameter. Forming the plurality of CMP gathers includes selecting a plurality of traces from the observed seismic dataset that share a common midpoint, i.e., the point on the surface halfway between the seismic source and seismic receiver. Each of the plurality of CMP gathers comprise a plurality of traces. Each trace comprises an ordinate series of sample values, a common midpoint location and a unique value of a secondary sorting parameter.

In accordance with one or more embodiments, a seismic data set may be expressed as $R(x_m, x_h, \xi)$, where the location vector $x_m=(x_{m,x}, x_{m,y})$, is the midpoint or lateral spatial locations, $x_h=(x_{h,x}, x_{h,y})$, or the secondary sorting parameter may be surface offset, subsurface offset, angle, or slowness, and $\xi$ is the vertical axis which may be an ordinate axis. The secondary sorting parameters, are well known to a person of ordinary skill in the art.

In Step 306, in accordance with one or more embodiments, a set of spatially adjacent CMP gathers are selected using a spatial windowing operator for each of the plurality of common midpoint gathers. The data is windowed according to Equation (1) such that:

$$R_w(x_m, x_h, \xi, v) = W(v)R(x_m, x_h, \xi) \qquad \text{Equation (1)}$$

where $R_w$ is the windowed response and $W(v)$ is a windowing operator which may be defined as:

$$W(v) = W_x(x', x'_o + \Delta x')W_\xi(\xi', \xi'_o + \Delta \xi') \qquad \text{Equation (2)}$$

where $W_x(x', x'_o + \Delta x')$ is the spatial windowing operator, and takes spatial or lateral windows such that the window index $x'=(x'_x, x'_y)$, $x'_o=(x'_{x,o}, x'_{y,o})$ which indicate the start of each window (so that it controls the overlap between adjacent windows) and $\Delta x'=(\Delta x'_x, \Delta x'_y)$ which indicate the spatial width of each window. The spatial windowing operator weights each spatially adjacent CMP gathers based on a distance between each spatially adjacent CMP gathers and the CMP gathers. The spatial windowing operator will determine a plurality of spatial windows covering the entire observed seismic dataset. The windows may have overlap between them according to the spatial windowing operator. The parameters for the spatial window operator may be chosen by a user skilled in the art based on the type and extent of noise present in the seismic image. An ordinate windowing operator $W_\xi(\xi', \xi'_o + \Delta \xi')$ takes ordinate windows, such that $\xi'$ indexes the window, $\xi'_o$ is the start of the ordinate window (so that it controls the overlap) and $\Delta \xi'$ is the width of the ordinate window. Using such windowing techniques allows the windows to be nonstationary, that is they can be different in size or overlap for a single pass of the denoising application. The ordinate windowing operator determines the window within a Radon transform and is discussed in more detail in FIG. 4. For simplicity with regards to the notation, we combine those variables in a vector such that:

$$v = (x', x'_o + \Delta x'; \xi', \xi'_o + \Delta \xi') \qquad \text{Equation (3)}$$

In Step 308, in accordance with one or more embodiments, a weighted midpoint gather is determined based on the CMP gather and the set of spatially adjacent CMP gathers. Steps 308-310 will be performed for a set of spatially adjacent CMP gathers, determined by a single spatial windowing operator. Step 308 defines the denoising application and the method to determine a single weighted midpoint gather is described in greater detail in FIG. 4.

In Step 310, in accordance with one or more embodiments, a denoised seismic dataset is formed by combining the weighted midpoint gathers using an inverse spatial windowing operator. Steps 308-310 have been performed on a set of spatially adjacent CMP gathers, determined by a single window given by the spatial windowing operator. The process is repeated for the plurality windows determined by the spatially windowing operator. In Step 310, all of the spatial windows are aggregated, and the spatial windowing operator is inverted so that each effect from every window is removed and is given by:

$$R_f(x_m, x_h, \xi) = \sum_i F(v_i) R_e(x_m, x_h, \xi, v_i) \qquad \text{Equation (4)}$$

$$F(v) = F_\xi(\xi', \xi'_o + \Delta \xi') F_x(x', x'_o + \Delta x'), \qquad \text{Equation (5)}$$

where $F_x(x', x'_o + \Delta x')$ in Equation 5 removes the effect of windowing in lateral directions. The operator $F_x = W_x^\dagger$ (i.e. $F_x$ can be the inverse or adjoint of $W_x$).

In Step 312, in accordance with one or more embodiments, a denoised seismic image is formed based on the denoised seismic dataset. The seismic dataset determined in step 310 may be at a number of different stages in seismic processing. The observed seismic dataset used as an input into the denoising may be raw or fully processed and migrated in accordance with one or more embodiments. Migration is a process by which seismic events are re-located in either space or time to their true subsurface positions. If the observed seismic dataset used as an input is pre-migration, the data is denoised, and the remainder of processing steps may be performed, including a migration.

In Step 314, in accordance with one or more embodiments, a target may be identified within the subterranean region of interest with a likelihood of containing hydrocarbons based on the denoised seismic image. Seismic noise may mask a target within the subterranean region of interest with a likelihood of containing hydrocarbons. Once the noise is removed by weighted multiplanar reconstruction, a target may be more easily identifiable. The denoised seismic image may aid in decisions as to if and where to drill for hydrocarbons, based on least in part, on the target.

In Step 316, in accordance with one or more embodiments, a wellbore path may be planned using a wellbore path planning system, based on the target and a wellbore, guided by the wellbore path, is drilled using a drilling system. A wellbore path planning system may plan a wellbore path from the surface to the target while avoiding any geohazards in the subsurface. A drilling system drilling a wellbore, guided by the wellbore path is depicted and discussed further in FIG. 7.

The input to the denoising may be a migrated dataset, in accordance with one or more embodiments. Once the seismic denoising by weighted multiplanar reconstruction is performed on data that has been migrated, or becomes migrated, a denoised seismic image may aid in identifying a target within the subterranean region of interest with a likelihood of containing hydrocarbons. A wellbore path to the target may be planned, using a wellbore path planning system and a wellbore guided by the wellbore path may be drilled using a drilling system.

Figure 4:
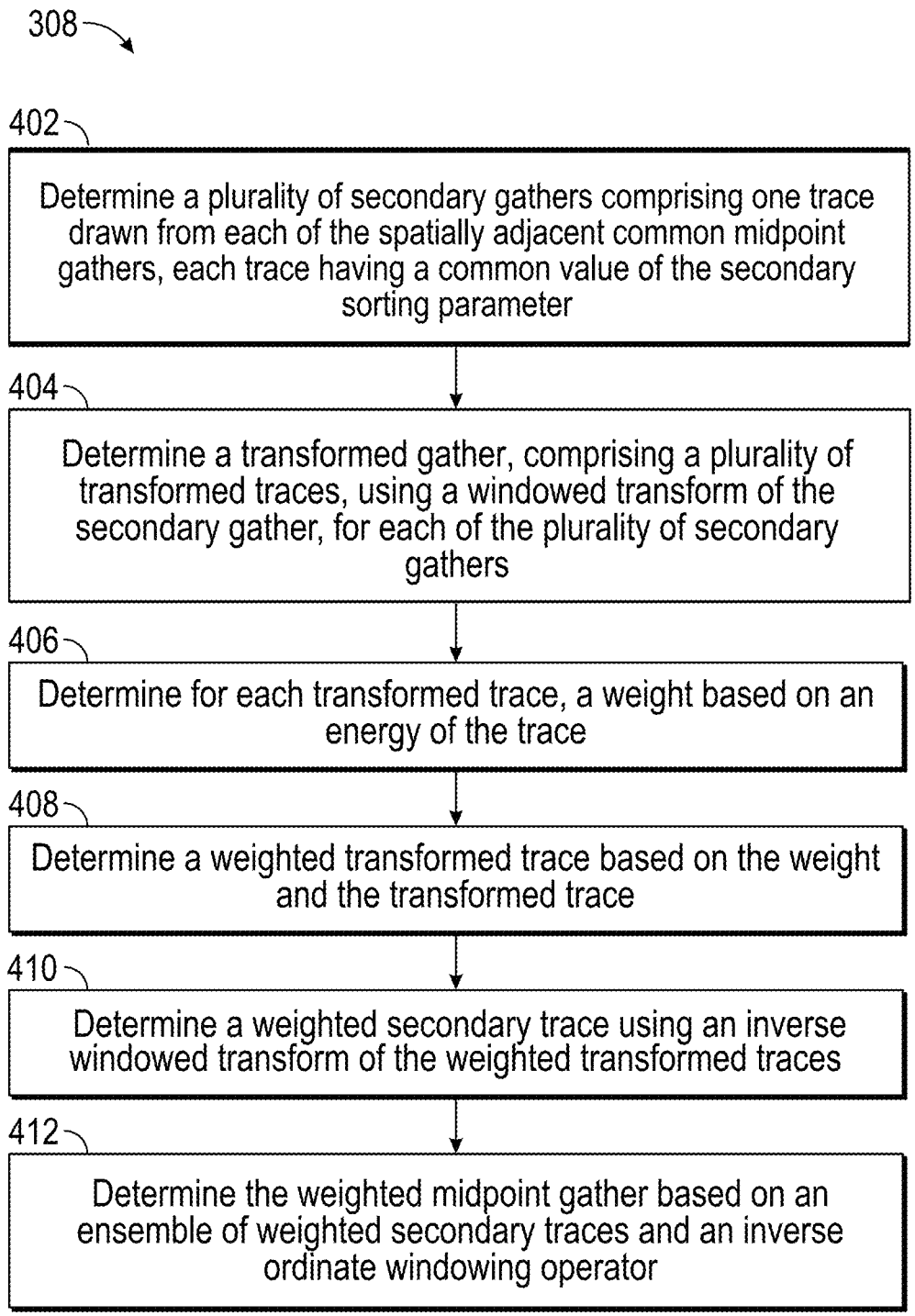
FIG. 4 shows a flowchart in accordance with one or more embodiments.

FIG. 4 shows a flowchart describing the method to determine a weighted midpoint gather and expands on Step 308 from FIG. 3. In Step 402, in accordance with one or more embodiments, a plurality of secondary gathers is determined. Each secondary gather comprises one trace drawn from each of the spatially adjacent CMP gathers, each trace comprising a common value of the secondary sorting parameter. The secondary parameter may be a common value of surface offset, subsurface offset, angle, or slowness.

In Step 404, a transformed gather is determined using a windowed transform of the secondary gather, for each of the plurality of secondary gathers. The transformed gather comprises a plurality of transformed traces. This windowed transform may be a Radon transform that is performed in a window determined by an ordinate windowing operator. The ordinate window may be centered around a center trace, which will be the focus of the denoise application. A Radon transform is also known as the τ-p transform, or plane wave decomposition and converts the seismic data a t-x domain or an ordinate—space domain into the τ-p domain, a space where seismic events are well separated. This ordinate windowing operator $W_\xi(\xi', \xi'_o+\Delta\xi')$ from Equation 2, takes ordinate windows, such that $\xi'$ indexes the window, $\xi'_o$ is the ordinate start of the window (so that it controls the overlap) and $\Delta\xi'$ is the ordinate width of the window. The ordinate windowing operator determines the window in which the Radon transform is performed. The transform secondary gather is transformed using a windowed transform into different multiplanar constituents such that:

$$R_e(x_m, x_h, \xi, v) = 1/n \Sigma_j \Sigma_i W_{scal}(s_j) R_W(x_m, x_h, \xi_m - s_j \cdot (x_m \pm x''_i), v) \quad \text{Equation (6)}$$

where $s=(s_x, s_y)$ is the dip and strike of each plane, $x''=(x''_x, x''_y)$ is the offset of the central midpoint or lateral spatial location of the gather, $\xi_m$ is a reference time of the central gather, and $W_{scal}(s_j)$ is scaling operator.

In Step 406, in accordance with one or more embodiments, a weight is determined, based on an energy of the trace, for each transformed trace. These transformed traces are now in the τ-p space, where noise may be differentiated from signal in a variety of methods. Weights measuring coherency, amplitude, dip, moveout and angle of incidence may be used to differentiate the unwanted noise inside the transformed τ-p space. The scaling operator $W_{scal}(s_j)$ is used to calculate and apply the weights. The windowed transform further comprises a plurality of weights applied to the plurality of transformed traces.

In Step 408, in accordance with one or more embodiments, a weighted transformed trace is determined based on the weight and the transformed trace. The windowed transform further includes a plurality of weights applied to the plurality of transformed traces, resulting in a plurality of weighted transform traces. The weights determined in Step 406 are applied by using the scaling operator $W_{scal}(s_j)$.

The scaling operator will penalize weak events or "weighting down" and emphasize strong ones or "weighting up". The weights are applied in the τ-p space, and the strong events that are emphasized represent signal, and the weak events that are penalized are the noise. The weights being applied within a set of windows that define a Radon transform, is the essence of the noise attenuation process. The weighted transformed traces may be transformed back into the x-t space.

In Step 410, in accordance with one or more embodiments, a weighted secondary trace is determined, using an inverse windowed transform of the weighted transformed traces. The inverse windowed transform may be an inverse Radon transform. Although the weights are calculated and applied for the plurality of transformed traces, only the trace centered within the ordinate window may be output from this method. This single output trace is the weighted secondary trace. The other transformed traces are necessary to determine weights based on measuring coherency, amplitude, dip, moveout or angle of incidence. The weighted transformed trace may be transformed back into the x-t, or ordinate-space domain and the remainder of the transformed traces are removed. The ordinate window may then be shifted, controlled by the ordinate windowing operator and centered on a new trace within the secondary gather. This process may be repeated for each trace in a secondary gather, outputting only the trace that is centered within the specific ordinate window. A weighted midpoint gather may then be created from the ensemble of weighted secondary traces.

In Step 412, in accordance with one or more embodiments, a weighted midpoint gather is determined based on an ensemble of weighted secondary traces and an inverse ordinate windowing operator. Each of the plurality weighted secondary traces are aggregated and the effects of localized windowing are removed determined by Equation (4) and Equation (5) given again below:

$$R_f(x_m, x_h, \xi) = \sum_i F(v_i) R_e(x_m, x_h, \xi, v_i) \quad \text{Equation (4)}$$

$$F(v) = F_\xi(\xi', \xi'_o + \Delta\xi') F_x(x', x'_o + \Delta x'), \quad \text{Equation (5)}$$

where $F(v)=F_\xi(\xi', \xi'_o+\Delta\xi')F_x(x', x'_o+\Delta x')$, describes the removal of the impact of local windowing, where $F_\xi(\xi', \xi'_o+\Delta\xi')$ is an inverse ordinate windowing operator and removes the impact of localized windowing from the ordinate windowing operator. The operator $F_\xi=W_\xi^\dagger$ (i.e. $F_\xi$ can be the inverse or adjoint of $W_\xi$) and similarly for the other operator such that $F_x=W_x^\dagger$. This denoised seismic dataset now comprises of a denoised group of CMP gathers or weighted midpoint gathers.

Figure 5:
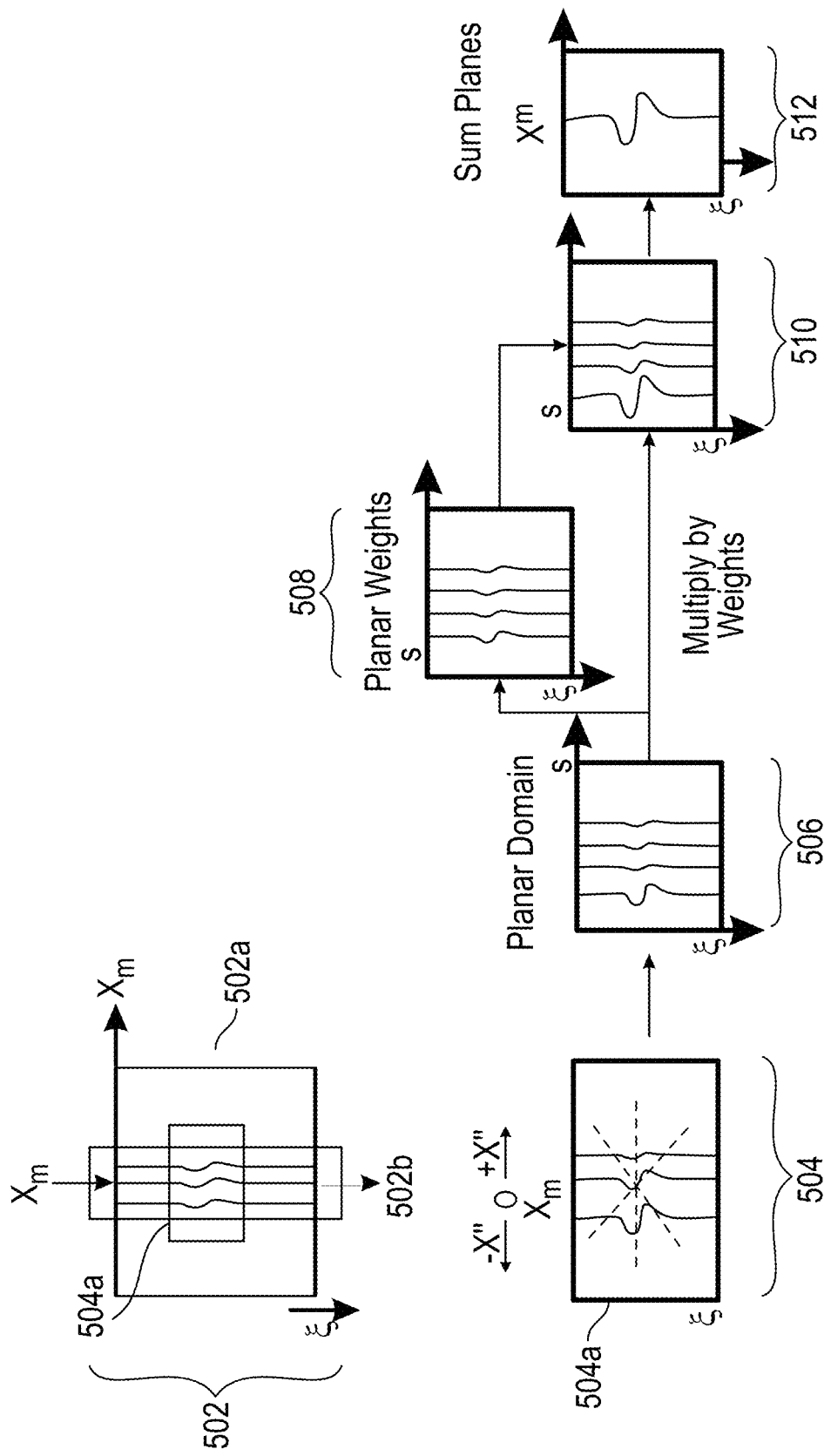
FIG. 5 shows a schematic diagram in accordance with one or more embodiments.

FIG. 5 depicts a schematic diagram that visually illustrates the seismic denoising by weighted multiplanar reconstruction method and more specifically how to determine a single weighted secondary trace. In Image 502, a secondary gather is shown. The secondary gather is described in Step 402, from FIG. 4. Each secondary gather comprises one trace drawn from each of the spatially adjacent CMP gathers, each trace comprising a common value of the secondary sorting parameter. The secondary sorting parameter may be a common value of surface offset, subsurface offset, angle, or slowness. In this case, in Image 502, the secondary sorting parameter is a common surface offset and the traces shown make up a common-offset gather, selected from spatially adjacent CMP gathers or a secondary gather. $x_m$, is the center trace of this secondary gather centered inside the ordinate window (504a).

Image 504 depicts a windowed transformation taking place in a window determined by an ordinate windowing operator and the corresponding transformed gather is shown in Image 506. The transformed gather comprises a plurality of transformed traces and the windowed transform may be a Radon transform and the traces from the secondary gather go from being in the x-t domain to a planar domain, or a τ-p domain. Image 508 depicts a weight being calculated on the transformed traces based on an energy of the trace or the variety of methods discussed in Step 406, from FIG. 4. The weights are applied in Image 510, by a scaling operator $W_{scal}(s_j)$ resulting in weighted transformed traces.

Image 512 depicts a weighted secondary trace, determined by using an inverse windowed transform of the weighted transformed traces. The inverse windowed transform may be an inverse Radon transform. Only the center trace, $x_m$, is output in the x-t domain, for each denoising application that takes place inside each ordinate window. The method may use the collection of transformed traces to determine the appropriate weights to be applied for the center trace, $x_m$, and the remainder of the transformed traces may then be removed. The ordinate window may then be shifted, controlled by the ordinate windowing operator and centered on a new trace within the adjacent set of CMPs. This process, described in FIG. 5, may be repeated for each trace in a secondary gather, outputting only the new weighted secondary trace after each denoising application. A weighted midpoint gather may then be created from the ensemble of weighted secondary traces and an inverse ordinate windowing operator.

FIGS. 6A-6D show examples of seismic data before and after the application of seismic denoising by weighted multiplanar reconstruction, in accordance with one or more embodiments. FIG. 6A shows a CMP gather for a subterranean region of interest, used as an input to the denoising method. The portion of the CMP gather shown, is enlarged to illustrate a section that includes noise. FIG. 6A shows two boxes highlighting the image of seismic reflections contaminated by noise (606a, 608a) at an increasing two-way travel time, indicated on the vertical axis (602) and at an increasing offset indicated by the horizontal axis (604). The noise contamination in FIG. 6A makes it difficult to determine the seismic reflections.

FIG. 6B shows a weighted midpoint gather after the application of denoising, in accordance with one or more embodiments. The weighted midpoint gather formation is described in FIG. 4. and is at the same CMP location shown in FIG. 6A to illustrate the effectiveness of the denoising application on the same seismic traces. FIG. 6B shows two boxes highlighting the image of seismic reflections after the removal of noise (606b, 608b) at an increasing two-way travel time, indicated on the vertical axis (602) and at an increasing offset indicated by the horizontal axis (604). Comparing the box 606a from FIGS. 6A and 606b from FIG. 6B, a significant amount of noise has been removed from the image. The image of seismic reflections inside the box 606b, after the application of denoising, are easily identifiable and display a greater continuity when compared to the box 606a, before the application of denoising. Comparing the box 608a from FIGS. 6A and 608b from FIG. 6B, once again a significant amount of noise has been removed from the lower portion of the image.

FIG. 6C shows a stacked seismic image before the application of seismic denoising by weighted multiplanar reconstruction, in accordance with one or more embodiments. FIG. 6C may be formed by stacking a plurality of CMP gathers, prior to the application of denoising and displays the image of seismic reflections at a time or depth indicated by the vertical axis (610) and at a horizontal location indicated by the horizontal axis (612). The stacked seismic image of FIG. 6C is enlarged to illustrate a section that includes noise. The stacked image prior to the application of denoising may have less noise compared to the CMP gathers prior to stacking. The noise that may be present in a seismic dataset may be reduced, or "stacked out", by stacking. Stacking is a common seismic imaging technique familiar to those skilled in the art and increases the signal to noise ratio in the seismic image. The stacked image is still contaminated with noise, however, illustrated by the two boxes (614a, 616a).

FIG. 6D shows a denoised seismic image, after the application of seismic denoising by weighted multiplanar reconstruction, in accordance with one or more embodiments. FIG. 6D may be formed by stacking the plurality of CMP gathers from the denoised seismic dataset and displays the image of seismic reflections at a indicated by the ordinal axis (610) and at a horizontal location indicated by the horizontal axis (612). The stacked image of FIG. 6D shows the same location as in FIG. 6C to illustrate the effectiveness of the denoising application. FIG. 6D shows two boxes highlighting the image of the seismic reflections after the removal of noise (614b, 616b). Comparing the box 614a from FIGS. 6C and 614b from FIG. 6B, a significant amount of noise has been removed from the image. The image of seismic reflections inside the box 614b, are easily identifiable and show a much greater continuity when compared to the image of seismic reflections identifiable in box 616a, from FIG. 6C. Comparing the box 616a from FIGS. 6C and 608b from FIG. 6D, once again a significant amount of noise has been removed from the image and the image of the seismic reflections are much more well defined, displaying an increased continuity. The ability to interpret a seismic image more cleanly, after the removal of noise, will aid in identifying a target in the subsurface.

Figure 7:
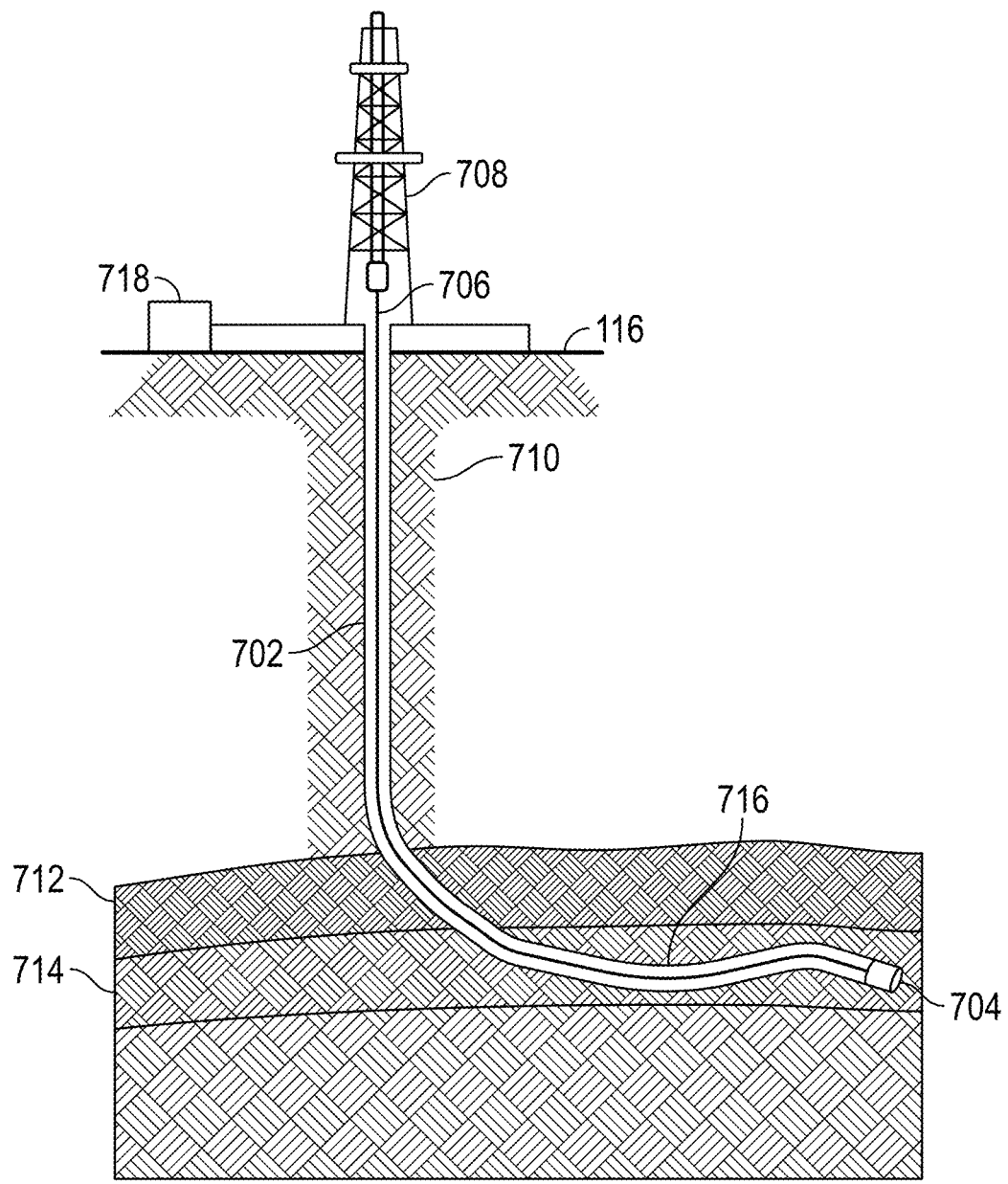
FIG. 7 shows a system in accordance with one or more embodiments.

FIG. 7 illustrates a drilling system in accordance with one or more embodiments. The denoised seismic image may aid in identifying a target within the subterranean region of interest with a likelihood of containing hydrocarbons. A wellbore path (716) may be planned using a wellbore path planning system (718), based at least in part, on the target (714). A wellbore (702) guided by the wellbore path (716) may be drilled by a drilling system in accordance with one or more embodiments. A drilling system includes a wellbore (702) that may be drilled by a drill bit (704) attached by a drillstring (706) to a drill rig (708) located on the surface of the earth (116). The wellbore (702) may traverse a plurality of overburden layers (610) and one or more cap-rock layers (712) to a target (714).

Figure 8:
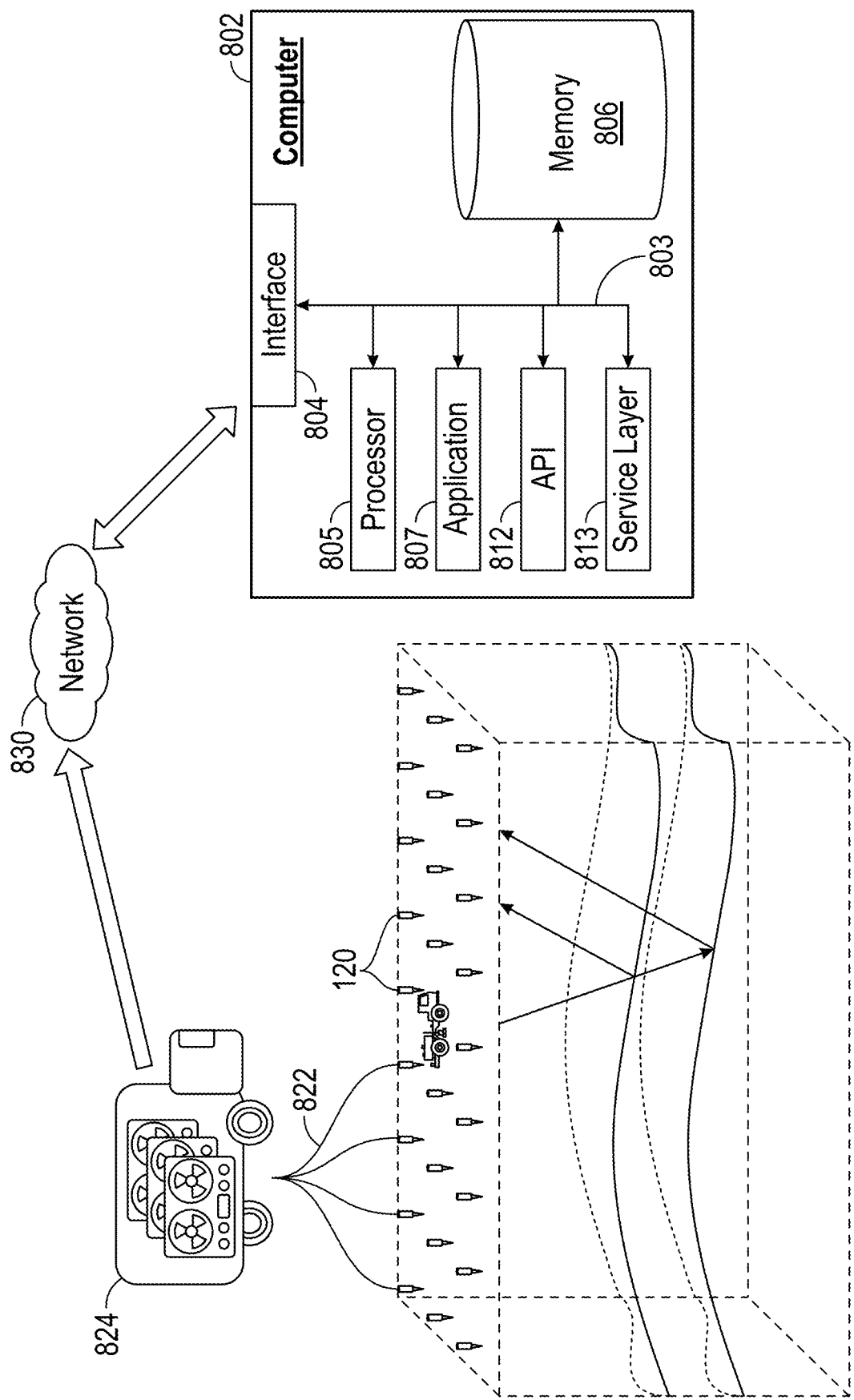
FIG. 8 shows a system in accordance with one or more embodiments.

FIG. 8 shows a seismic recording and processing system, in accordance with one or more embodiments. The data recorded by a plurality of seismic receivers (120) may be transmitted to a seismic recording facility (824) located in the vicinity of the seismic survey. The seismic recording facility may be one or more seismic recording trucks (824). The plurality of seismic receivers (120) may be in digital or analogue telecommunication with the seismic recording facility (824). The telecommunication may be performed over telemetry channels (822) that may be electrical cables, such as coaxial cables, or may be performed wireless using wireless systems, such as Wi-Fi or Bluetooth. Digitization of the seismic data may be performed at each seismic receiver (120), or at the seismic recording facility (824), or at an intermediate telemetry node (not shown) between the seismic receiver (120) and the seismic recording facility (824).

The seismic data may be recorded at the seismic recording facility (824) and stored on non-transitory computer memory. The computer memory may be one or more computer hard-drives, or one or more computer memory tapes, or any other convenient computer memory media familiar to one skilled in the art. The seismic data may be transmitted to a computer (802) for processing. The computer (802) may be located in or near the seismic recording facility (824) or may be located at a remote location, that may be in another city, country, or continent. The seismic data may be transmitted from the seismic recording facility (824) to a computer (802) for processing. The transmission may occur over a network (830) that may be a local area network using an ethernet or Wi-Fi system, or alternatively the network (830) may be a wide area network using an internet or intranet service. Alternatively, seismic data may be transmitted over a network (830) using satellite communication networks. Most commonly, because of its size, seismic data may be transmitted by physically transporting the computer memory, such as computer tapes or hard drives, in which the seismic data is stored from the seismic recording facility (824) to the location of the computer (802) to be used for processing.

FIG. 8 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (713). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a denoised seismic image, comprising:
    obtaining an observed seismic dataset for a subterranean region of interest; and
    using a computer processor:
        forming a plurality of common midpoint gathers from the observed seismic dataset, wherein each of the plurality of common midpoint gathers comprises a plurality of traces, each trace comprising an ordinate series of sample values, a common midpoint location and a unique value of a secondary sorting parameter;
        for each of the plurality of common midpoint gathers:
            selecting a set of spatially adjacent common midpoint gathers using a spatial windowing operator; and
            determining a weighted midpoint gather based, at least in part, on the common midpoint gather and the set of spatially adjacent common midpoint gathers;
        forming a denoised seismic dataset by combining the weighted midpoint gathers using an inverse spatial windowing operator; and
        forming the denoised seismic image based, at least in part, on the denoised seismic dataset.

2. The method of claim 1, further comprising:
    identifying a target within the subterranean region of interest with a likelihood of containing hydrocarbons based, at least in part, on the denoised seismic image.

3. The method of claim 2, further comprising:
    planning a wellbore path using a wellbore path planning system based, at least in part, on the target; and
    drilling a wellbore guided by the wellbore path using a drilling system.

4. The method of claim 1, wherein determining the weighted midpoint gather comprises:
    determining a plurality of secondary gathers, wherein each secondary gather comprises one trace drawn from each of the spatially adjacent common midpoint gathers, each trace comprising a common value of the secondary sorting parameter;
    for each of the plurality of secondary gathers:
        determining a transformed gather using a windowed transform of the secondary gather, wherein the transformed gather comprises a plurality of transformed traces;
        for each transformed trace:
            determining a weight based, at least in part on an energy of the trace; and
            determining a weighted transformed trace based on the weight and the transformed trace; and
        determining a weighted secondary trace using an inverse windowed transform of the weighted transformed traces; and
    determining the weighted midpoint gather based on an ensemble of weighted secondary traces and an inverse ordinate windowing operator.

5. The method of claim 4, wherein the windowed transform comprises a Radon transform performed over an ordinate window defined by an ordinate windowing operator.

6. The method of claim 4, wherein the windowed transform further comprises a plurality of weights applied to the plurality of samples within the ordinate window by a scaling operator.

7. The method of claim 1, wherein the spatial windowing operator weights each spatially adjacent common midpoint gathers based on a distance between each spatially adjacent common midpoint gathers and the common midpoint gather.

8. The method of claim 1, wherein the ordinate series of sample values comprises a time series of sample values.

9. A non-transitory computer readable medium, storing instructions executable by a computer processor, the instructions comprising functionality for:
receiving an observed seismic dataset for a subterranean region of interest; and
using a computer processor,
forming a plurality of common midpoint gathers from the observed seismic dataset, wherein each of the plurality of common midpoint gathers comprises a plurality of traces, each trace comprising an ordinate series of sample values, a common midpoint location and a unique value of a secondary sorting parameter,
for each of the plurality of common midpoint gathers:
selecting a set of spatially adjacent common midpoint gathers using a spatial windowing operator, and
determining a weighted midpoint gather based, at least in part, on the common midpoint gather and the set of spatially adjacent common midpoint gathers;
forming a denoised seismic dataset by combining the weighted midpoint gathers using an inverse spatial windowing operator, and
forming a denoised seismic image based, at least in part, on the denoised seismic dataset; and
identifying a target within the subterranean region of interest with a likelihood of containing hydrocarbons based, at least in part, on the denoised seismic image.

10. The non-transitory computer readable medium of claim 9, wherein determining the weighted midpoint gather comprises:
determining a plurality of secondary gathers, wherein each secondary gather comprises one trace drawn from each of the spatially adjacent common midpoint gathers, each trace comprising a common value of the secondary sorting parameter;
for each of the plurality of secondary gathers,
determining a transformed gather using a windowed transform of the secondary gather, wherein the transformed gather comprises a plurality of transformed traces;
for each transformed trace,
determining a weight based, at least in part on an energy of the trace;
determining a weighted transformed trace based on the weight and the transformed trace;
determining a weighted secondary trace using an inverse windowed transform of the weighted transformed traces;
determining the weighted midpoint gather based on an ensemble of weighted secondary traces and an inverse ordinate windowing operator.

11. The non-transitory computer readable medium of claim 10, wherein the windowed transform comprises a Radon transform performed over an ordinate window defined by an ordinate windowing operator.

12. The non-transitory computer readable medium of claim 10, wherein the windowed transform further comprises a plurality of weights applied to the plurality of samples within the ordinate window by a scaling operator.

13. The non-transitory computer readable medium of claim 9, wherein the spatial windowing operator weights each spatially adjacent common midpoint gathers based on a distance between each spatially adjacent common midpoint gathers and the common midpoint gather.

14. The non-transitory computer readable medium of claim 9, wherein the ordinate series of sample values comprises a time series of sample values.

15. A system, comprising:
a seismic acquisition system configured to acquire an observed seismic dataset; and
a seismic processor configured to:
receive an observed seismic dataset for a subterranean region of interest from the seismic acquisition system; and
form a plurality of common midpoint gathers from the observed seismic dataset, wherein each of the plurality of common midpoint gathers comprises a plurality of traces, each trace comprising an ordinate series of sample values, a common midpoint location and a unique value of a secondary sorting parameter,
for each of the plurality of common midpoint gathers:
select a set of spatially adjacent common midpoint gathers using a spatial windowing operator, and
determine a weighted midpoint gather based, at least in part, on the common midpoint gather and the set of spatially adjacent common midpoint gathers;
form a denoised seismic dataset by combining the weighted midpoint gathers using an inverse spatial windowing operator, and
form a denoised seismic image based, at least in part, on the denoised seismic dataset; and
identify a target within the subterranean region of interest with a likelihood of containing hydrocarbons based, at least in part, on the denoised seismic image.

16. The system of claim 15, further comprising:
a wellbore path planning system configured to plan a planned wellbore path based, at least in part, on the target; and
a drilling system to drill a wellbore guided by the wellbore path.

17. The system of claim 15, wherein determining the weighted midpoint gather comprises:
determining a plurality of secondary gathers, wherein each secondary gather comprises one trace drawn from each of the spatially adjacent common midpoint gathers, each trace comprising a common value of the secondary sorting parameter;
for each of the plurality of secondary gathers,
determining a transformed gather using a windowed transform of the secondary gather, wherein the transformed gather comprises a plurality of transformed traces,
for each transformed trace,
determining a weight based, at least in part on an energy of the trace;
determining a weighted transformed trace based on the weight and the transformed trace; and
determining a weighted secondary trace using an inverse windowed transform of the weighted transformed traces; and
determining the weighted midpoint gather based on an ensemble of weighted secondary traces and an inverse ordinate windowing operator.

18. The system of claim 17, wherein the windowed transform comprises a Radon transform performed over an ordinate window defined by an ordinate windowing operator and a plurality of weights applied to the plurality of samples within the ordinate window by a scaling operator.

19. The system of claim 15, wherein the spatial windowing operator weights each spatially adjacent common midpoint gathers based on a distance between each spatially adjacent common midpoint gathers and the common midpoint gather.

20. The system of claim 15, wherein the ordinate series of sample values comprises a time series of sample values.

\* \* \* \* \*